United States Patent [19]

Tamamura et al.

[11] 4,163,266

[45] Jul. 31, 1979

[54] MAGNETIC TAPE SCANNING ASSEMBLY FOR USE IN VIDEO TAPE RECORDER AND PLAYBACK APPARATUS

[75] Inventors: Takeo Tamamura, Hitachi; Naotatsu Asahi, Katsuta; Makoto Nakayama, Hitachi-ohta; Masataka Kasai, Mito; Akira Saito, Katsuta; Toshimichi Terada, Kanagawa, all of Japan

[73] Assignee: Hitachi, Ltd., Japan

[21] Appl. No.: 872,454

[22] Filed: Jan. 26, 1978

[30] Foreign Application Priority Data

Jan. 28, 1977 [JP] Japan ............................ 52-7773

[51] Int. Cl.² .................. G11B 5/52; G11B 15/60; G11B 21/18
[52] U.S. Cl. ...................... 360/84; 360/107; 360/130.21
[58] Field of Search .................. 360/84–85, 360/81, 107, 122, 130, 128; 148/1–2; 226/196, 193, 86, 97

[56] References Cited

U.S. PATENT DOCUMENTS

| | | | |
|---|---|---|---|
| 3,107,280 | 10/1963 | Suetsugu | 360/84 |
| 3,333,753 | 8/1967 | Streets | 360/84 |
| 3,663,767 | 5/1972 | Shimotori et al. | 360/122 |
| 3,919,717 | 11/1975 | Cullen et al. | 360/122 |
| 3,955,215 | 5/1976 | Hosoi | 360/84 |
| 3,979,772 | 9/1976 | Umeda | 360/85 |
| 4,034,357 | 7/1977 | Mehta | 365/3 |
| 4,040,019 | 8/1977 | Bullock | 365/36 |
| 4,052,710 | 10/1977 | Calhoun et al. | 365/3 |
| 4,070,658 | 1/1978 | Giess et al. | 365/36 |

Primary Examiner—Alfred H. Eddleman
Attorney, Agent, or Firm—Craig and Antonelli

[57] ABSTRACT

Guiding drums for a magnetic tape scanning assembly for use in a video tape recorder and playback apparatus are made of a specific aluminum-silicon alloy consisting essentially of 8 to 15% by weight of silicon, 1 to 4% by weight of copper, 0.05 to 0.6% by weight of magnesium, and the balance being aluminum. A mean grain size of silicon crystal in eutectic structure is controlled to be 5 µm or less. The drums are provided with a diagonal or helical guiding path on the peripheries thereof in which there are formed on the guiding path generally continuous, fine machining lines having a roughness (H max) of 1 to 6 µm, preferably 2 to 5 µm, in a direction parallel with sliding travel of a magnetic tape.

17 Claims, 11 Drawing Figures

NOT TESTED ← | → TESTED

FIG. 7(b)

NOT TESTED ← | → TESTED

FIG. 7(c)

NOT TESTED ← | → TESTED

MAGNETIC TAPE SCANNING ASSEMBLY FOR USE IN VIDEO TAPE RECORDER AND PLAYBACK APPARATUS

BACKGROUND OF THE INVENTION

The present invention relates to a magnetic tape scanning assembly for use in a video tape recorder and playback apparatus, and more particularly to a magnetic tape scanning assembly having a guiding path that has desirable surface characteristics.

U.S. Pat. No. 3,955,215 discloses apparatus and method for forming a head drum assembly for a video tape recorder and playback apparatus in which a rotatable magnetic head assembly is interposed between a pair of stationary drums. A pair of magnetic heads fixed to the head assembly are protruded from the peripheries of the drums so that a magnetic tape which passes a guiding path diagonally formed on the peripleries of the drums is magnetically scanned with the magnetic heads as the magnetic tape travel with guiding path. Although various types of loading and unloading mechanisms and systems are known and disclosed as in U.S. Pat. No. 3,979,772, and U.S. Pat. No. 3,333,753, explanations about tape loading and unloading mechanisms and systems are omitted from the specification for simplicity, as such the explanations are not concerned with the present invention.

U.S. Pat. No. 3,333,753 discloses another type of a magnetic tape scanning assembly in which a rotatable drum having a pair of magnetic heads is supported on a shaft, and a stationary drum is coaxially supported about the shaft. A diagonal or helical guiding path is formed on the peripheries of the drums. These two types of magnetic tape scanning assemblies are on practical use.

In the conventional magnetic tape scanning assemblies, guiding means including a cyindrical stationary drum and a rotatable magnetic head assembly are of extreme importance. As a magnetic tape under tension slides the guiding path formed on the stationary drum, the drum must have a small coefficient of sliding friction and a good wear resistance. If a coefficient of sliding friction is large, jitters may appear on the screen of a cathode ray tube. Further, if wear resistance is poor, the surface of the guiding path will become like a mirror surface resulting that the magnetic tape is adsorbed and sticked on such the surface of the guiding path. Such the adsorption of the magnetic tape will make the scanning assembly inoperable.

In order to make small a cofficient of sliding friction of the guiding path of the drums which have heretofore been made of aluminum material or aluminum-silicon alloy material, various measures have been employed one of which was surface treatment with, such as, ceramic coating, alumite coating, metal plating, etc. These conventional surface treatments were not staisfied in wear resistance and coefficient of sliding friction and were expensive because of an increase in manufacturing steps.

As a demand for high quality magnetic tapes with highly smoothed surfaces increases, the requirements i,e, low coefficient of sliding friction and wear resistance are becoming severer and severer. In recent color video tape recorder and playback apparatus, the following characteristics are required for magnetic tape guiding assemblies.

(1) Small coefficient of sliding friction—less than 0.3 when measured under a sliding test which will be described hereinafter.
(2) Good wear resistance—a wear amount ($\mu$m) in terms of decrease in peak height of the guiding path is less than 0.7 when measured under a wear test which will be described hereinafter.
(3) Magnetic tape surface is not injured by scraching with the guiding path.
(4) Good surface condition of the guiding path—the surface should maintain a good surface condition for a long period of time.

SUMMARY OF THE INVENTION

Accordingly, it is an object of the present invention to provide a magnetic tape scanning assembly for use in a video tape recorder and playback apparatus, which has an improved guiding path along which a magnetic tape travels slidably.

It is another object of the present invention to provide a magnetic tape scanning assembly including an improved stationary drum for slidably guiding a magnetic tape.

It is still another object to provide a magnetic tape scanning assembly including a stationary and rotatable drums for slidably guiding a magnetic tape.

It is further an object to provide a magnetic tape scanning assembly with improved operating characteristics, whereby excellent video recording and playback are established for a long period of time.

In order to accomplish the objects of the present invention, there is provided a magnetic tape scanning assembly having a guiding path whose coefficient of sliding friction is sufficiently small, and generally continuous, fine guiding lines having a suitable roughness are formed on the surface of the guiding path in a direction of travel of the mangetic tape. More specifically, the coefficient is less than 0.3 over a load range of 10 to 100 grams and the guiding lines have a roughness of 1 to 6 $\mu$m. In order to obtain the guiding path, the present invention employed an aluminum-silicon alloy material which consists essentially of 8 to 15% by weight of silicon, 1 to 4% by weight of copper, 0.05 to 0.6% by weight of magnesium, the balance being aluminum, wherein a mean grain size of silicon crystal in eutectic structure is less than 6 $\mu$m, more specifically less than 4 $\mu$m. A preferable composition is: Si 9.5 to 11.5%, Cu 2 to 3%, Mg 0.1 to 0.5%, Al bal.

Other objects and features and advantages of the present invention will be apparent from the following detailed description taken in conjunction with the accompanying drawings.

DETAILED DESCRIPTION OF EMBODIMENTS

Figure 1:
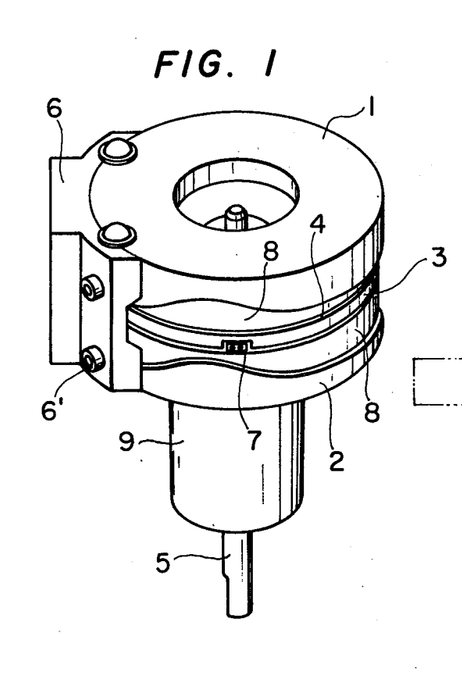
FIG. 1 is a perspective view of a magnetic tape scanning assembly to which the present invention is applied.
Figure 2:
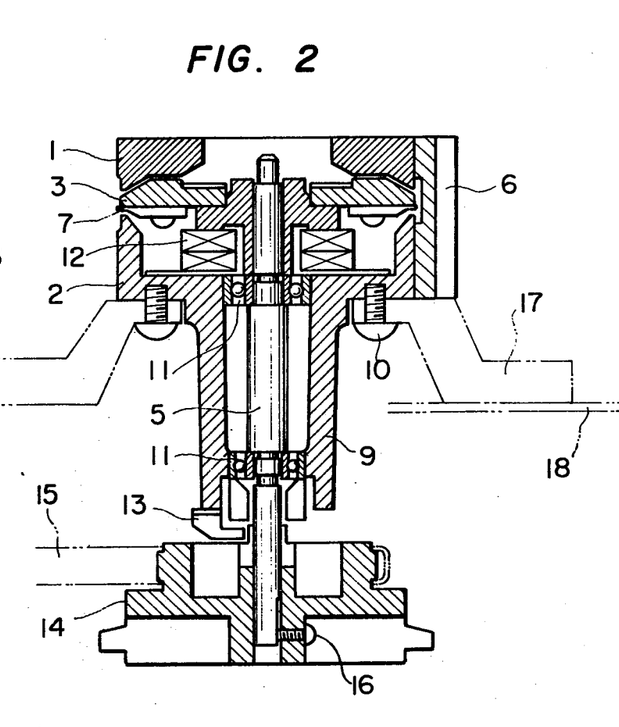
FIG. 2 is a virtically sectional view of a magnetic tape scanning assembly of the present invention.

As shown in FIG. 1, a magnetic tape scanning assembly of one type generally comprises a stationary cylindrical upper drum 1, a stationary cylindrical lower drum 2, and a rotatable magnetic head assembly 3, which is interposed between the upper and lower drums 1, 2 with a small clearances 4. The drums 1, 2 and the magnetic head assembly 3 shown as a disc shape in FIGS. 1 and 2 are coaxially mounted around a shaft 5. The upper and lower drums 1, 2 are fixedly connected by means of a connector 6 and bolts 6'. The magnetic head assembly 3 is rotatably supported on the shaft 5 by means of ball hearing assemblies 11, while the upper drums 1, 2 are fixedly mounted on a base plate 18 by means of bolts 10 and sub-base plates 17, as shown in FIG. 2.

The magnetic head assembly 3 is provided with one or more magnetic heads 7 that are slightly protruded to the extent of 0.05 to 0.3 mm in the radial direction of the drums 1, 2 and disc 3. A guiding path 8 is diagonally or helically formed on the drums 1, 2 and the head assembly 3. The guiding path 8 is slightly recessed from the peripheries of the drums 1, 2 so that a stable guide for the magnetic tape is established. Preferably, the depth of the guiding path is controlled to be 0.05 to 0.3 mm.

The lower drum 2 has a sleeve portion 9 extending downwardly around the shaft 5 as shown in FIGS. 1 and 2. In this embodiment, the drums 1, 2 and magnetic assembly 3 other than magnetic heads 7 are made of a specific aluminum-silicon alloy material. The composition of the aluminum-silicon alloy is as follows:

Si: 11% by weight
Cu: 2.5% by weight
Mg: 0.3% by weight
Al: balance

The alloy material was prepared by a continuous casting method at a cooling rate of 50° C./sec., whereby tabular or flaky silicon crystals were crystallized in eutectic structure. A mean width of the tabular or flaky silicon crystals was 4 μm. The so prepared cast product was subjected to 80% plastic working, whereby the tabular or flaky silicon crystals were finely divided. Then, the plastic worked product was heat-treated at 420° C. to 450° C. for 2 hours to effect a solution treatment. Thereafter, a hard againg treatment was carried out at 170° C. for 10 hours. As a result, in the alloy structure there were formed generally round silicon crystals in eutectic structure having a mean grain size of 1.7 μm. Several drums shown in FIGS. 1 and 2 were cut out from the resulting alloy material. Then, the guiding paths were formed by machining. The roughness (H max) of the guiding paths was controlled to be 3 to 4 μm. When the surfaces of the guiding paths were observed through an electron microscope, it was found that generally continuous, fine machinning lines were formed. The machinning lines were arranged in the direction of travel of a magnetic tape.

The roughness of the surface of the guiding path 8 plays a very important role. When the roughness is too large, the magnetic tape will be injured during travel and a coefficient of sliding friction will inveitably increase. According to the experiments, the guiding path should have a coefficient of sliding friction of less than 0.3, preferably 0.28 or less. In order to obtain the coefficient of less than 0.3, the roughness (H max) should be 1 to 6 μm, preferably 2 to 5 μm.

When the roughness is too small, or the surface of the guiding path is too smooth like a mirror surface, a magnetic tape will be adsorbed on the surface so that the tape will be sticked on the guiding path. Such adsorption phenomenon will make the scanning assembly inoperable. Therefore, the roughness should be 1 μm or more, preferably 2 μm or more. In most cases the roughness is controlled to be 3 to 4 μm.

The magnetic head assembly 3 is provided with a rotary transformer 12. The sleeve 9 has a brush 13 for earthing. The shaft 5 is rotated by turning a pulley 14 which is driven by a belt 15. The shaft 5 is fixed to the pulley 14 by means of a bolt 16. In this embodiment, the connector 6 and pulley 14 were made of a conventional aluminum die-cast material.

Figure 3:
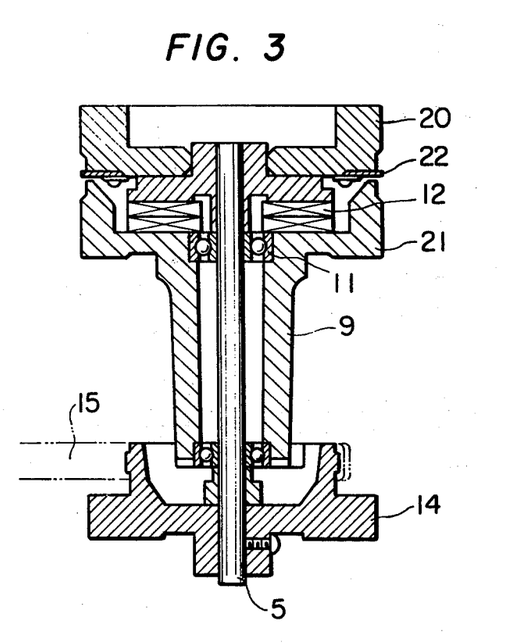
FIG. 3 is a virtically sectional view of another type of a magnetic tape scanning assembly to which the present invention is applied.

In FIG. 3 there is shown another type of a scanning assembly in which an upper drum 20 is rotatable, while a lower drum 21 is stational. In this embodiment, therefore, no rotatable disc like disc 3 in FIGS. 1 and 2 is disposed. The upper drum 20 is provided with a pair of magnetic heads 22 that are slightly protruded from the guiding path 8 as in FIGS. 1 and 2. A shaft 5 is fixedly connected to the upper drum 20. The drum 20 is also provided with a rotary transformer 12. The shaft 5 is rotated in the same manner as described in connection with FIGS. 1 and 2.

In this embodiment, the upper drum 20 and lower drum 21 were made of an aluminum-silicon alloy material. The composition of the alloy consists of 11% by weight of silicon, 2.5% by weight of copper, 0.3% by weight of magnesium, the balance being aluminum, and a mean grain size of generally round silicon crystals in eutectic structure is 1.8 μm. A roughness (H max) of the surface of the guiding path was 3 μm and a coefficient of sliding friction was 0.24 over a load range of 20 to 100 grams. The scanning assembly exhibited satisfactory characteristics for a long period of time.

Figure 4:
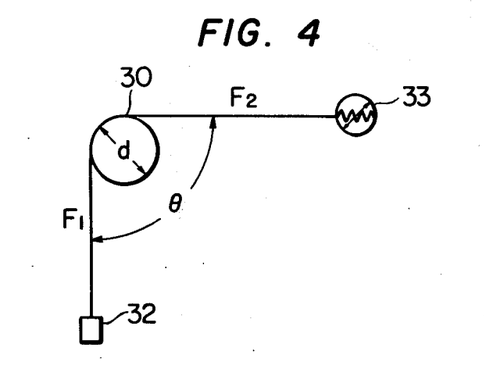
FIG. 4 is a schematic diagram showing a method for measuring a coefficient of sliding friction.
Figure 5:
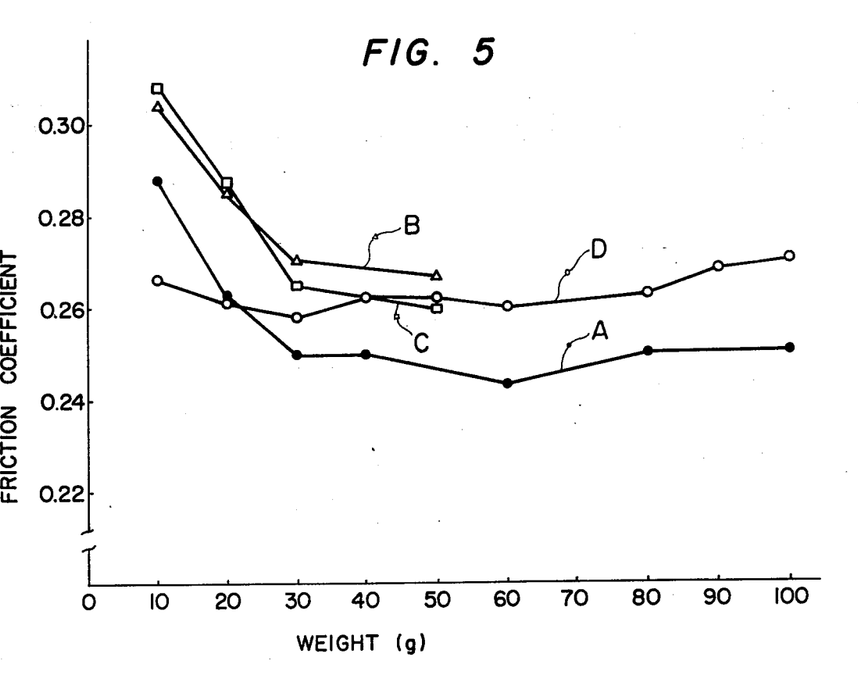
FIG. 5 is a graph showing coefficients of sliding friction obtained by the method shown by FIG. 4.

FIG. 4 shows a method of measuring a coefficient of sliding friction and FIG. 5 shows the measuring results of coefficients. A commercially available magnetic tape 31 for video tape recorder and playback apparatus ($CrO_2$ tape, manufactured by Sony Corp., Japan) is placed on a solid rod 30 having a diameter d of 5 mm under tension exerted by a weight 32. An angle $\theta$ is adjusted to 90 degrees. The surface condition of the rod 30 is conditioned to be as the same as that of the guiding path 8. The magnetic tape thus placed is pulled through a spring gauge 33, so that a force $F_2$ is measured as a sliding friction. In order to measure coefficients of sliding friction under different forces $F_1$, the weight 32 was changed over the range of from 10 grams to 100 grams. Since there is the following relation, a coefficient ($\mu$) can be calculated:

$$F_2 = F_1 e^{\mu\theta}$$

The results are shown in FIG. 5 in which a curve A of coefficients of sliding friction in the case of the aluminum-silicon alloy material mentioned hereinbefore is under 0.3. Since a magnetic tape is under about 30 to 50 grams during normal recording and playback operations of video tape apparatus, the drums made of the specific aluminum-silicon alloy material are particularly suitable due to low coefficients of sliding friction (0.24 to 0.25).

A curve D shows coefficients of sliding friction for an alumina rod. It is apparent that the rod made of the specific aluminum-silicon alloy material has a smaller coeficient than that of ceramic rod.

A curve B shows coefficients of sliding friction for an as cast aluminum material consisting essentially of 0.6% by weight of silicon, 0.5% by weight of iron, 1.5% by weight of magnesium, 4% by weight of copper, 2% by weight of nickel and the balance being aluminum. The rod was cut out of the as cast aluminum material. The surface of the rod was machined to have a roughness of 3 to 4 μm. A curve C shows coefficients of sliding friction for an as cast aluminum-silicon alloy consisting essentially of 10.5% by weight of silicon, 3% by weight of copper, 1.2% by weight of magnesium, 1.1% by weight of nickel, 0.5% by weight of iron and the balance being aluminum. From the curves B and C it is apparent that the rods made of these conventional materials have coefficients of sliding friction of 0.31 to 0.27. These conventional materials have 0.27 to 0.26 of coefficients under weight of 30 to 40 grams. Drums made of these conventional materials tend to produce jitters on the screen.

It has been confirmed that the coefficients thus measured represent coefficients of the actual drums.

Figure 6A:
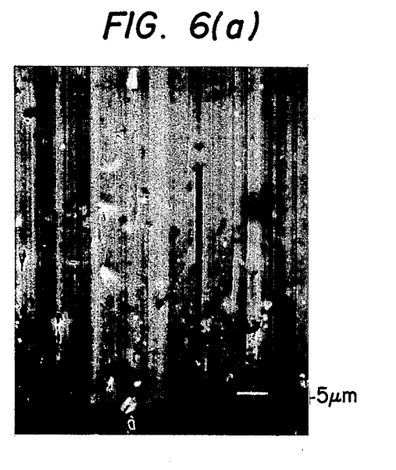
FIGS. 6(a) to 6(c) are microphotographs of the surfaces of guiding paths of a drum of the present invention and of conventional drums.
Figure 6B:
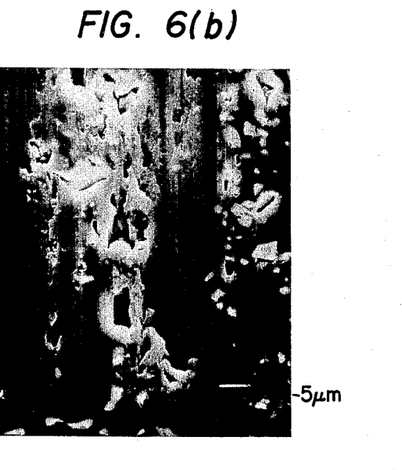
Figure 6C:
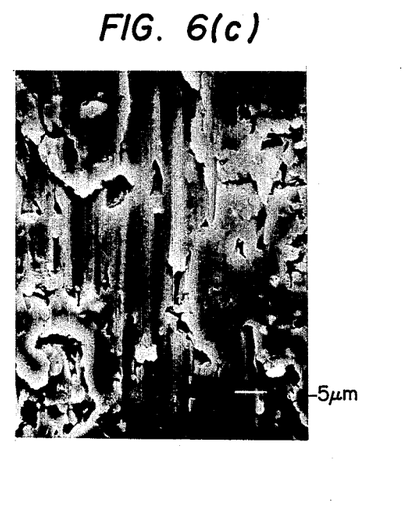

Surface conditions or maching lines on the surface of guiding paths were observed through an electron microscope. FIGS. 6(a) to 6(c) show the surface conditions. A magnitude of the photographs is 2000. FIG. 6(a) shows the surface of the guiding path of the present invention; FIG. 6(b) the surface of the guiding path of the as cast aluminum material; and FIG. 6(c) the surface of the guiding path of the as cast aluminum-silicon alloy material. The roughness (H max) of the surfaces were all controlled to 3 to 4 μm. As is seen from FIGS. 6(a) to 6(c), the machinning lines of the guiding path of the present invention are continuous and smooth in a direction of travel of a magnetic tape, while in the case of the conventional drums, the machining lines are neither continuous nor smooth. In particular several large concaves are found in the photograph of FIG. 6(c). The inventors believe that these concaves were formed by plucking silicon crystals off from the matrix during machinning.

Figure 7A:
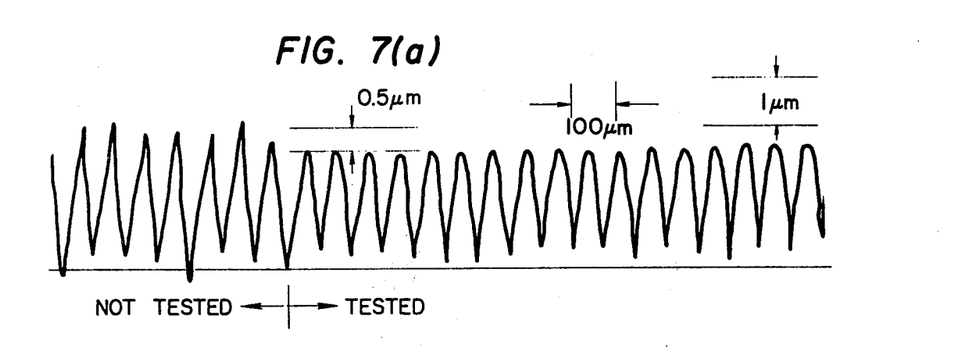
FIGS. 7(a) and 7(c) show the results of wear test using a drum of the present invention and wear tests of conventional drums.
Figure 7B:
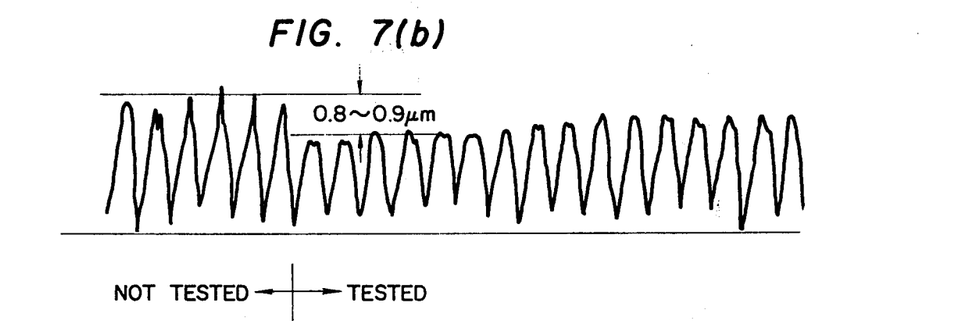
Figure 7C:
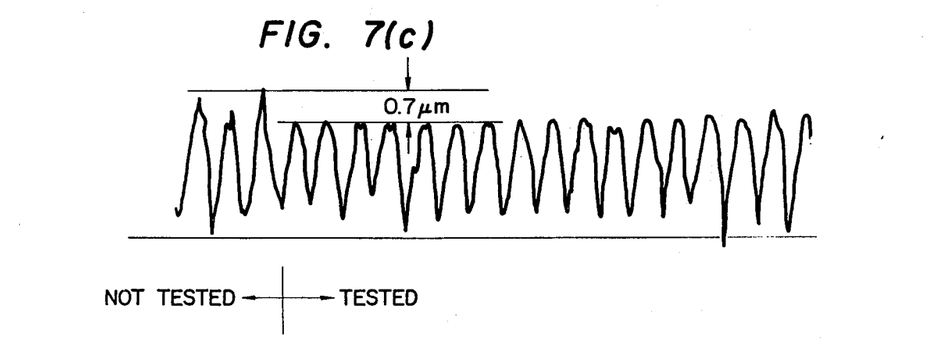

It is another important advantage of the drums of the present invention that the guiding path has excellent wear resistance. FIGS. 7(a) to 7(c) are results of a wear test using actual drums. The wear test was continued for 600 to 700 hours. A magnetic tape used in this test was the same as used in measuring coefficients of sliding friction. FIG. 7(a) shows the result of the drum made of the specific aluminum-silicon alloy material; FIG. 7(b) the result of the drum made of the as cast aluminum material; and FIG. 7(c) the result of the drum made of the as cast aluminum-silicon alloy material.

Wear amounts in FIGS. 7(a) to 7(c) are represented by decrease in roughness (H max). For the purpose of comparison there are shown in left hands in FIGS. 7(a) to 7(c) surface curves of not-tested regions of the guiding path. It should be noted, however, that the curves of FIGS. 7(a) to 7(c) do not show the actual surface contuors at all, because they are only recorded diagrams.

It is apparent from FIGS. 7(a) to 7(c) that a wear amount of the drums of the invention is only 0.5 μm, while wear amounts of the conventional drums are 0.8 to 1 μm and 0.7 μm, respectively. Therefore, the guiding path of the drum of the present invention can keep desired surface conditions for a long period of time. According to the calculation of service life of the drums, it is speculated that the drums of the present invention has about three times the service life of the conventional drums.

The present inventors further tested different drums made of the aluminum-silicon alloy materials having the following compositions and mean grain size of silicon crystals in eutectic structure. A casting method, plastic working, and heat treatment are also shown below.

| Compositions (% by weight) | | | | Mean grain size (μm) | Cooling speed of ingot (°C./sec) | Working ratio (%) | Solution treatment | Hard aging |
| --- | --- | --- | --- | --- | --- | --- | --- | --- |
| Si | Cu | Mg | Al | | | | | |
| 9.6 | 2.5 | 0.1 | bal. | 1.7 | 30 | 80 | 450° C. × 3 hours | 170° C. × 10 hours |
| 10.5 | 2.1 | 0.3 | " | 2.1 | 30 | 85 | " | " |
| 11.4 | 1.5 | 0.2 | " | 1.6 | 55 | 90 | " | " |
| 13.6 | 2.8 | 0.5 | " | 1.7 | 60 | 50 | " | " |
| 14.0 | 1.5 | 0.1 | " | 2.8 | 50 | 40 | " | " |

The drums made of these alloy materials were found to have desired characteristics. On the other hand, when the mean grain size of silicon crystals in eutectic structure is larger than 5 μm, it will be difficult to give the surface of the guiding path the desired surface conditions by machinning. Further, when an amount of silicon is less than 8%, a wear amount of the drum increases so that a service life of such the drum will be short. On the other hand, when an amount of silicon exceeds 15%, a large amount of primary silicon crystal which can not be divided by plastic working will be crystalized in the matrix so that a magnetic tape may be injured by the large primary silicon crystal grains during travel.

Magnesium and copper function as to strengthen the aluminum-silicon alloy material. An excessive addition or short addition of these elements may degrade physical properties of the alloy material. Although other elements such as iron, chromium, manganese, nickel, zirconium and titanium may be present in the alloy material. In the case of iron, the maximum amount should be controlled to be less than 0.7% by weight. In the case of chromium, manganese, nickel, zirconium or titanium, amounts thereof should be controlled to 0.15% by weight or less.

Although a method of preparing the aluminum-silicon alloy material has been described in brief, a detailed description is found in U.S. patent application Ser. No. 567,009, filed Apr. 10, 1975, now U.S. Pat. No. 4,077,810, titled "Aluminum Alloys Having Improved Mechanical Properties and Workability And Method of Making Same."

What we claim is:

1. A magnetic tape scanning assembly comprising:

(1) guiding means including a cylindrical stationary drum member for slidably guiding a magnetic tape along the smooth surface of a guiding path formed in the periphery of said drum;

(2) a rotatable magnetic head assembly including at least one magnetic head which is sightly radially protruded from the periphery of said drum and is located in a position to be in slidable contact with the surface of the magnetic tape, whereby said magnetic head scans the magnetic tape as it travels along said path;

(3) means for coaxially supporting said magnetic head assembly and guiding drum in such a manner that a small clearance is formed between the lower end of said magnetic head assembly and the upper end of said drum, whereby said magnetic head assembly rotates irrespectively of said drum;

(4) means for driving said supporting means; and (5) wherein at least said path of said drum is made of an aluminum-silicon alloy consisting essentially of 8 to 15% by weight of silicon, 1 to 4% by weight of copper, 0.05 to 0.6% by weight of magnesium, and the balance being aluminum, an average grain size of round eutectic silicon crystals in the alloy being not larger than 5 $\mu$m, and generally continuous, fine machinning lines with a roughness of 1 to 6 $\mu$m formed on the surface of the guiding path in a direction of travel of the magnetic tape.

2. A magnetic tape scanning assembly according to claim 1, wherein the surface of said path has a roughness of 2 to 5 $\mu$m.

3. A magnetic tape scanning assembly according to claim 1, wherein the guiding path has a coefficient of sliding friction of 0.28 or less over a load range of 10 to 100 grams.

4. A magnetic tape scanning assembly according to claim 1, wherein said drum is made of said aluminum-silicon alloy.

5. A magnetic tape scanning assembly according to claim 1, wherein said path is slightly recessed from the periphery of said drum to the extent of 0.05 to 0.3 mm.

6. A magnetic tape scanning assembly according to claim 4, wherein said aluminum-silicon alloy consists essentially of 9.5 to 11.5% by weight of silicon, 2 to 3% by weight of copper, 0.1 to 0.5% by weight of magnesium, the balance being aluminum, and a friction coefficient of said guiding path is not larger than 0.27 under a load range of 20 to 100 grams.

7. A magnetic tape scanning assembly comprising:
(1) a stationary lower drum having a smooth cylindrical periphery;
(2) a stationary upper drum having a smooth cylindrical periphery of substantially the same diameter as that of said lower drum, a parallel clearance being formed therebetween,
(3) a rotatable magnetic head assembly, interposed between said upper and lower drums, including a pair of magnetic heads fixed to a disc having substantially the same diameter as that of said upper and lower drums, said magnetic heads being slightly protruded from the peripheries of said drums and said disc so that a magnetic tape is magnetically scanned with said magnetic heads as the magnetic tape travels along a guiding path formed in the peripheries of said upper and lower drums;
(4) a shaft member for supporting and driving said disc, said disc and upper and lower drums being coaxilly assembled about said shaft member;
(5) means for rotating said shaft member; and
(6) wherein at least said guiding path is made of an aluminum-silicon alloy consisting essentially of 8 to 15% by weight of silicon, 1 to 4% by weight of copper, 0.05 to 0.6% by weight of magnesium, the balance being aluminum, a mean grain size of round eutectic silicon crystals being not larger than 4 $\mu$m, and generally continuous, fine machining lines with a roughness (H max) of 1 to 6 $\mu$m are formed on the surface of the guiding path in a direction of travel of the magnetic tape.

8. A magnetic tape scanning assembly according to claim 7, wherein the surface of said guiding path has a roughness of 2 to 5 $\mu$m.

9. A magnetic tape scanning assembly according to claim 7, wherein the guiding path has a coefficient of sliding friction of 0.28 or less over a load range of 10 to 100 grams.

10. A magnetic tape scanning assembly according to claim 7, wherein said drums are made of said aluminum-silicon alloy.

11. A magnetic tape scanning assembly according to claim 7, wherein said drums and disc are made of said aluminum-silicon alloy.

12. A magnetic tape scanning assembly according to claim 7, wherein said path is slightly recessed from the peripheries of said drums and disc to the extent of 0.05 to 0.3 mm.

13. A magnetic tape scanning assembly according to claim 11, wherein said aluminum-silicon alloy consists essentially of 9.5 to 11.5% by weight of silicon, 2 to 3% by weight of copper, 0.1 to 0.5% by weight of magnesium, the balance being aluminum, and a coefficient of sliding friction of said guiding path is not larger than 0.27 over a load range of 20 to 100 grams.

14. A magnetic tape scanning assembly comprising:
(1) a stationary lower drum having a smooth cylindrical periphery;
(2) a rotatable upper drum having a smooth cylindrical perphery of substantially the same diameter as that of said lower drum, a parallel clearance being formed therebetween, and a guiding path which is slightly recessed from the peripheries of said upper and lower drums being formed in the peripheries;
(3) a pair of magnetic heads, fixed to the lower end of said drum, being slightly protruded from the periphery of said guiding path so that a magnetic tape is magnetically scanned with said magnetic heads as the magnetic tape travels along said guiding path;
(4) a shaft member for supporting and driving said upper drum, said upper and lower drum being coaxially assembled about said shaft member;
(5) means for rotating said shaft member; and
(6) wherein at least said guiding path is made of an aluminum-silicon alloy consisting essentially of 8 to 15% by weight of silicon, 1 to 4% by weight of copper, 0.05 to 0.6% by weight of magnesium, the balance being aluminum, mean grain size of round eutectic silicon crystals being not larger than 4 $\mu$m, and generally continuous, fine machining lines with a roughness of 1 to 6 $\mu$m are formed on the surface of the guiding path in a direction of travel of the magnetic tape.

15. A magnetic tape scanning assembly according to claim 14, wherein the surface of said guiding path has a roughness of 2 to 5 $\mu$m.

16. A magnetic tape scanning assembly according to claim 14, wherein said upper and lower drums are made of said aluminum-silicon alloy.

17. A magnetic tape scanning assembly according to claim 16, wherein said aluminum-silicon alloy consists essentially of 9.5 to 11.5% by weight of silicon, 2 to 3% by weight of copper, 0.1 to 0.5% by weight of magnesium, the balance being aluminum, and a coefficient of sliding friction of said guiding path is not larger than 0.27 over a load range of 20 to 100 grams.

* * * * *